United States Patent
Mihara et al.

(10) Patent No.: US 10,516,309 B2
(45) Date of Patent: Dec. 24, 2019

(54) ROTATING MACHINE

(71) Applicant: TOSHIBA MITSUBISHI-ELECTRIC INDUSTRIAL SYSTEMS CORPORATION, Chuo-ku (JP)

(72) Inventors: Takayuki Mihara, Chuo-ku (JP); Dan Umeda, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 77 days.

(21) Appl. No.: 15/580,950

(22) PCT Filed: Jun. 20, 2016

(86) PCT No.: PCT/JP2016/002961
§ 371 (c)(1),
(2) Date: Dec. 8, 2017

(87) PCT Pub. No.: WO2016/203778
PCT Pub. Date: Dec. 22, 2016

(65) Prior Publication Data
US 2018/0175688 A1 Jun. 21, 2018

(30) Foreign Application Priority Data
Jun. 19, 2015 (JP) .................. 2015-123925

(51) Int. Cl.
*H02K 1/32* (2006.01)
*H02K 9/00* (2006.01)
(Continued)

(52) U.S. Cl.
CPC ............... *H02K 1/325* (2013.01); *H02K 9/06* (2013.01); *H02K 19/14* (2013.01); *H02K 1/24* (2013.01)

(58) Field of Classification Search
CPC .......... H02K 19/14; H02K 1/24; H02K 1/325; H02K 9/06
See application file for complete search history.

(56) References Cited

U.S. PATENT DOCUMENTS

| 5,214,325 A * | 5/1993 | Matson ..................... H02K 9/06 310/58 |
| 6,570,276 B1 * | 5/2003 | Morel ................... F04D 25/082 310/52 |

(Continued)

FOREIGN PATENT DOCUMENTS

| CN | 103683663 A | 3/2014 |
| JP | 55-143666 U | 10/1980 |

(Continued)

OTHER PUBLICATIONS

International Search Report dated Aug. 16, 2016 in PCT/JP2016/002961 filed Jun. 20, 2016.

(Continued)

*Primary Examiner* — Yuriy Semenenko
(74) *Attorney, Agent, or Firm* — Oblon, McClelland, Maier & Neustadt, L.L.P.

(57) ABSTRACT

Provided is a rotating machine capable of obtaining a uniform temperature distribution by improving a cooling air flow to a heat generation portion. The rotating machine has a salient pole rotor (11) and a stator (12). The salient pole rotor (11) has a rotation shaft (15), a disk-shaped spoke (22), a cylindrical rib (23), and a plurality of salient poles (25) arranged in a radial shape on an outer circumferential surface of the rib (23), each of the salient poles (25) being formed along an axial direction of the rotation shaft (15). The disk-shaped spoke (22) is provided to an anti-feeding side end of the cooling air of the salient pole rotor (11). The cylindrical rib (23) is provided with through-holes (231)

(Continued)

extending from an inner space of the cylindrical rib (23) through gaps between a plurality of salient poles (25).

3 Claims, 2 Drawing Sheets

(51) Int. Cl.
 *H02K 9/06* (2006.01)
 *H02K 19/14* (2006.01)
 *H02K 1/24* (2006.01)

(56) References Cited

U.S. PATENT DOCUMENTS

| | | | |
|---|---|---|---|
| 9,419,498 B2 * | 8/2016 | Kimura | H02K 9/10 |
| 2006/0226717 A1 * | 10/2006 | Nagayama | H02K 9/00 |
| | | | 310/58 |
| 2010/0231066 A1 * | 9/2010 | Korner | H02K 1/32 |
| | | | 310/61 |
| 2015/0061427 A1 * | 3/2015 | Vartiainen | H02K 1/2773 |
| | | | 310/59 |

FOREIGN PATENT DOCUMENTS

| | | |
|---|---|---|
| JP | 57-170674 U | 10/1982 |
| JP | 4-368450 A | 12/1992 |
| JP | 6-90547 A | 3/1994 |

OTHER PUBLICATIONS

Combined Office Action and Search Report dated Jan. 3, 2019 in Chinese Patent Application No. 201680034879.9, citing document AO therein, 8 pages (with partial unedited computer generated English translation and English translation of categories of cited documents).

Office Action dated Jun. 5, 2018 in Japanese Patent Application No. 2015-123925 5 pages (with partial unedited computer generated English translation).

Office Action dated Jan. 15, 2019 in Japanese Patent Application No. 2015-123925 citing document AO therein, 5 pages (with partial unedited computer generated English translation).

Second Office Action issued in corresponding Chinese Application No. 2016800348799 dated Sep. 10, 2019 (with English translation).

Office Action issued in corresponding Indian Application No. 201717044657 dated Oct. 18, 2019.

\* cited by examiner

ROTATING MACHINE

FIELD

Embodiments of the present invention relate to a ventilation cooling type rotating machine having a salient pole rotor to feed a cooling air from its one end side.

BACKGROUND

The rotating machine used as a synchronous motor or generator has a salient pole rotor and a stator surrounding an outer circumference of the salient pole rotor with a predetermined interval. The salient pole rotor has a disk-shaped spoke installed to an outer circumference of an axial center of its rotation shaft and a cylindrical rib having an inner circumferential surface integrally installed to an outer circumference of the spoke. A plurality of salient poles are formed on an outer circumferential surface of the rib in a radial shape and are arranged in parallel along an axial direction of the rotation shaft. In addition, field coils are wound around each of the salient poles.

As one of the cooling methods of the rotating machine, a ventilation cooling type is employed, in which the cooling air is fed from one end side of the axial direction of the salient pole rotor (for example, see Patent Document 1).

Typically, the salient pole rotor and the stator surrounding the outer circumference of the salient pole rotor are provided inside the closed frame. A ventilation fan is provided to one end side of the rotation shaft of the salient pole rotor inside this frame, so that the air is fed in a radial direction as the rotation shaft is rotated. The air blowing by the fan is sent to the opposite end of the salient pole rotor through a cooler provided between an inner surface of the closed frame and an outer surface side of the stator and flows to the stator and the salient pole rotor along the axial direction from the opposite end (one end side).

The cooling air blowing as described above cools a coil end of the stator, flows between the stator and the salient pole rotor, and is then pushed to spaces between a plurality of salient poles provided to the outer circumferential surface of the rib described above. In addition, the cooling air flows through the spaces in the axial direction to cool each salient pole and arrives at an inlet side of the aforementioned ventilation fan. Furthermore, a part of the air flowing between the stator and the salient pole rotor flows to the outer side of the stator through a ventilation duct provided in a radial direction of the stator core and then similarly arrives at the inlet side of the aforementioned ventilation fan.

In this ventilation type, the cooling air flows from one end side of the salient pole rotor to the stator and the salient pole rotor along the axial direction. Therefore, the temperature of the rotating machine increases from the aforementioned one end side to the opposite side end and reaches its maximum in this opposite side. That is, in the ventilation cooling type of the prior art, the air flows to the heating portion of the rotating machine (including the stator and each salient pole of the salient pole rotor) in a single direction. Therefore, a temperature distribution becomes irregular.

CITATION LIST

Patent Documents

Patent Document 1: JP 6-90547 A

SUMMARY OF INVENTION

In this manner, in the ventilation cooling type rotating machine in which the cooling air is fed from one end side of the salient pole rotor, the air flows to the heating portion in a single direction. Therefore, the temperature distribution becomes irregular. An object of the present invention is to provide a rotating machine capable of providing a uniform temperature distribution by improving the cooling air flow to the heating portion.

According to an aspect of the invention, there is provided a ventilation cooling type rotating machine including: a salient pole rotor, and a stator surrounding an outer circumference of the salient pole rotor with a predetermined interval to feed a cooling air from one end side of an axial direction of the salient pole rotor, the salient pole rotor having a rotation shaft, a disk-shaped spoke integrally installed to an outer circumference of the rotation shaft, a cylindrical rib having an inner circumferential surface integrally installed to an outer circumference of the disk-shaped spoke, and a plurality of salient poles arranged in a radial shape on an outer circumferential surface of the cylindrical rib, each of the salient poles being formed along an axial direction of the rotation shaft, and having field coils wound around each of the salient poles, wherein the disk-shaped spoke is provided to an anti-feeding side end of the cooling air of the salient pole rotor, and the cylindrical rib is provided with through-holes extending from an inner space of the cylindrical rib through gaps between the plurality of salient poles.

In this configuration, it is possible to supply a sufficient amount of the cooling air across a plurality of salient poles as a whole through the through-holes provided in the rib. Therefore, it is possible to obtain a substantially uniform temperature distribution.

DETAILED DESCRIPTION

Embodiments of the invention will now be described in details with reference to the accompanying drawings.

Figure 1:
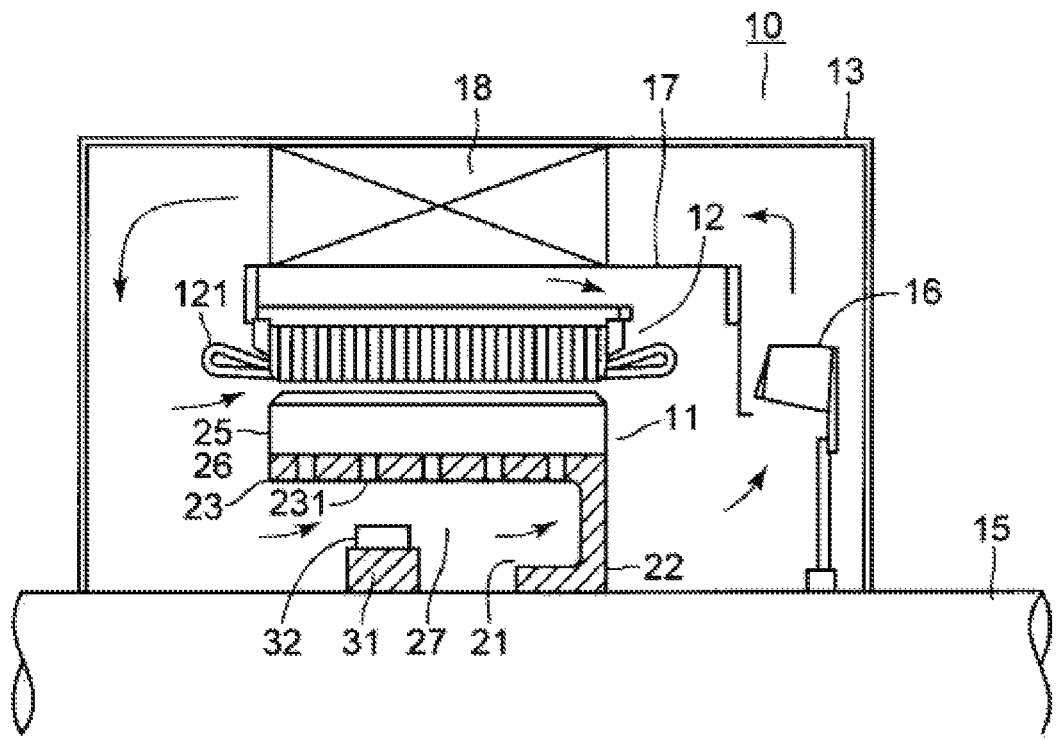
FIG. 1 is a vertical cross-sectional view illustrating a rotating machine according to an embodiment of the invention.
Figure 2:
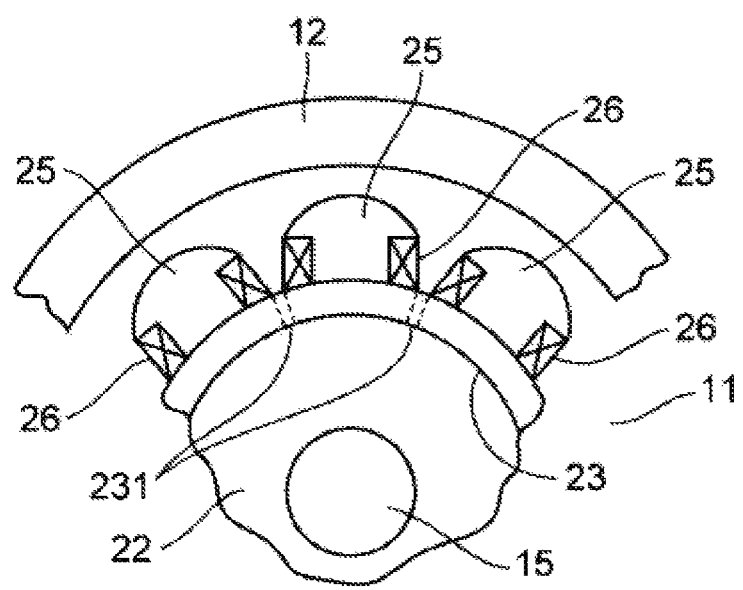
FIG. 2 is a diagram illustrating a part of a horizontal cross section of the rotating machine of FIG. 1.

In FIGS. 1 and 2, a rotating machine 10 used as a synchronous motor or generator has a salient pole rotor 11 and a stator 12 surrounding an outer circumference of the salient pole rotor 11 with a predetermined interval. The salient pole rotor 11 and the stator 12 surrounding the outer circumference of the salient pole rotor 11 are provided inside a closed frame 13. In this frame 13, a ventilation fan 16 is provided to one end side of the rotation shaft 15 of the salient pole rotor 11 to blow the air in a radial direction in synchronization with rotation of the rotation shaft 15.

A cooler 18 is provided between an inner surface of the closed frame 13 and an air guide plate 17 provided on an outer surface side of the stator 12. The air blowing from the fan 16 is guided to the inner surface of the frame 13 and the outer surface (upper surface in the drawing) of the air guide plate 17 and is sent to the cooler 18. The air is cooled as it passes through the cooler 18 to the left side of the drawing, so that it is then sent to the opposite end (left end side in the drawing) of the salient pole rotor 11. In addition, the air flows to the right side of the drawing toward the stator 12 and the salient pole rotor 11 from this opposite end (one end side).

The salient pole rotor 11 has a disk-shaped spoke 22 integrally installed to the outer circumference of the rotation shaft 15 described above with a boss 21, and a cylindrical rib 23 having an inner circumferential surface integrally installed to the outer circumference of the spoke 22. As illustrated in FIG. 2, a plurality of salient poles 25 are formed in the outer circumferential surface of the rib 23 in a radial shape and are arranged along an axial direction of the rotation shaft 15 as illustrated in FIG. 1. Field coils 26 are wound around each of the salient poles 25.

Here, the disk-shaped spoke included in the salient pole rotor 11 is provided to be biased to the right side of the salient pole rotor 11 in the drawing opposite to the feeding side of the cooling air described above, that is, an anti-feeding side end of the cooling air. Therefore, an air-blowing space 27 is generated across the entire area of the axial direction of the rib 23 between the outer circumference of the rotation shaft 15 and the inner circumference of the cylindrical rib 23. In addition, the cylindrical rib 23 is provided with a plurality of through-holes 231 extending from the inner space 27 through gaps between a plurality of salient poles 25 across almost the entire area of the circumferential surface of the rib 23.

In the aforementioned configuration, the salient pole rotor 11 is rotated with respect to its rotation shaft 15 in synchronization during the operation of the rotating machine 10. By virtue of this rotation, the air inside the frame 13 is fed in a radial direction by the fan 16. The air blowing in the radial direction is guided to the cooler 18 by the inner surface of the frame 13 and the air guide plate 17. In addition, the air is cooled when it passes through the left side of the cooler 18 in the drawing, so that it serves as a cooling air. Note that the cooler 18 has a plurality of cooling pipes (not shown) supplied with a refrigerant (liquid or gas) from the outside, so that the cooling pipes are cooled by virtue of heat exchange with the air inside the frame 13.

The cool air passing through the cooler 18 is fed from the left side of the drawing inside the frame 13 to the right side of the drawing toward the salient pole rotor 11 and the stator 12 as a cooling air. This cooling air cools the coil ends 121 of the stator 12 and flows between the stator 12 and the salient pole rotor 11 and toward the space 27 of the cylindrical rib 23.

Similar to the prior art, a part of the cooling air flowing between the stator 12 and the salient pole rotor 11 cools the stator 12 and flows to the outer side as it passes through a ventilation duct (not shown) formed in a radial direction of the core of the stator 12. The cooling air then flows to the right side of the drawing through the inner surface (lower surface of the drawing) of the air guide plate 17 and to the inlet side of the fan 16 (left side of the drawing). In addition, the remaining part of the cooling air flowing between the stator 12 and the salient pole rotor 11 flows between a plurality of salient poles 25 formed in the outer circumference of the rib 23 in the radial shape along the axial direction to cool the plurality of salient poles 25 and then arrives at the inlet side of the fan 16.

Since a downstream end (right end of the drawing) of the cooling air flowing through the cylindrical rib 23 is blocked by the disk-shaped spoke 22, the cooling air flows between a plurality of salient poles 25 described above through the through-holes 231 provided to the circumferential surface of the rib 23. That is, the cooling air is supplied to the gaps between a plurality of salient poles 25 through the through-holes 231, and the cooling air is sufficiently supplied to the downstream side (right side of the drawing) of the axial direction. Therefore, it is possible to cool the salient pole rotor 11 as a whole substantially uniformly.

The amount of the air supplied between the salient pole rotor 11 and the stator 12 through the through-holes 231 is added to the stator 12. Therefore, a ventilation amount to the ventilation duct (not shown) provided in the radial direction also increases, so that it is possible to achieve substantially uniform cooling as a whole.

Figure 3:
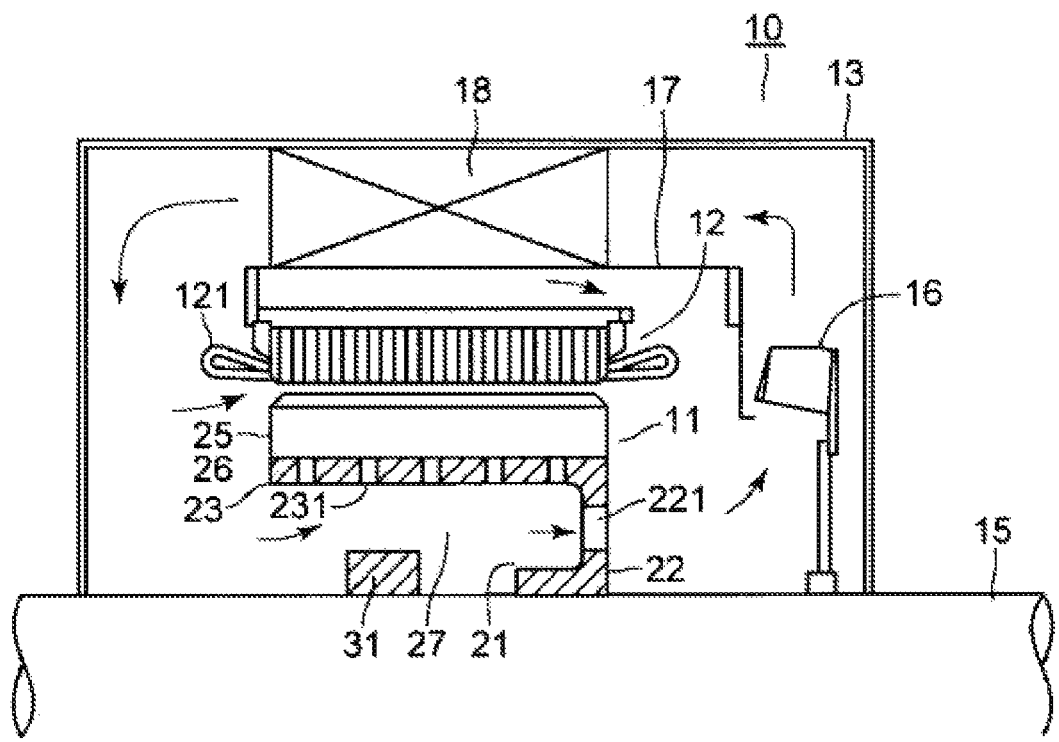
FIG. 3 is a vertical cross-sectional view illustrating a rotating machine according to another embodiment of the invention.

In the embodiment of FIG. 3, the disk-shaped spoke 22 is provided with an air vent 221 penetrating the front and back sides thereof. In the embodiment of FIG. 1, the right end of the cylindrical rib 23 of the drawing is blocked by the disk-shaped spoke 22, so that the cooling air flowing through the cylindrical rib 23 flows through the through-holes 231 provided on the circumferential surface of the rib 23. However, in this case, a ventilation resistance may excessively increase as a whole. If the ventilation resistance excessively increases in this manner, the ventilation amount is reduced as a whole. Therefore, the ventilation resistance is adjusted not to be excessive by providing the air vent 221 penetrating the front and back sides of the disk-shaped spoke 22.

It is possible to obtain a sufficient ventilation amount as a whole by providing the air vent 221 in this manner to adjust the ventilation area thereof. In addition, it is possible to adjust the ventilation resistance such that a sufficient amount of the air can be supplied between a plurality of salient poles 25 through the through-holes 231.

A discharge resistor 31 may be installed to (wound around) an outer circumferential space (the space 27) of the rotation shaft 15 facing the inner circumferential surface of the cylindrical rib 23 as illustrated in FIGS. 1 and 3. That is, in a case where the rotating machine 10 is a synchronous motor, the discharge resistor 31 is used to generate a short circuit in the field coil 26 in order to obtain a start torque for its starting operation. Since this discharge resistor 31 generates heat as it is electrically conducted, it is placed in the space 27 of the cylindrical rib 23 where the cooling air is concentratedly ventilated.

In this configuration, it is possible to effectively cool the discharge resistor 31 that generates heat by electrical conduction.

A fin 32 may be integrally provided to the outer circumference of the discharge resistor 31 described above along the axial direction of the rotation shaft 15 as illustrated in FIG. 1. This fin 32 is rotated in synchronization with the rotation shaft 15 to generate a ventilation air in the radial direction.

In this configuration, it is possible to further effectively dissipate heat of the discharge resistor 31 and more effectively ventilate the air of the space 27 toward the through-holes 231 provided in the rib 23 by generating the ventilation air in the radial direction.

While several embodiments of the invention have been described, these embodiments are presented by way of example and are not intended to limit the scope of the invention. These novel embodiments can be implemented in various other forms, and various omissions, substitutions, and changes may be possible without departing from the spirit and scope of the invention. These embodiments and modifications thereof are included in the scope and gist of the invention and are included in the invention described in the claims and the equivalents thereof.

REFERENCE SIGNS LIST 10 rotating machine
11 salient pole rotor 12 stator
15 rotation shaft
22 disk-shaped spoke
221 air vent
23 cylindrical rib
231 through-hole
25 salient pole
31 discharge resistor
32 fin

The invention claimed is:

1. A ventilation cooling type rotating machine comprising:
- a salient pole rotor; and
- a stator surrounding an outer circumference of the salient pole rotor with a predetermined interval to feed a cooling air from one end side of an axial direction of the salient pole rotor, wherein the salient pole rotor includes:
- a rotation shaft;
- a disk-shaped spoke integrally installed to an outer circumference of the rotation shaft;
- a cylindrical rib having an inner circumferential surface integrally installed to an outer circumference of the disk-shaped spoke; and
- a plurality of salient poles arranged in a radial shape on an outer circumferential surface of the cylindrical rib, each of the salient poles being formed along an axial direction of the rotation shaft, wherein the disk-shaped spoke is provided to an anti-feeding side end of the cooling air of the salient pole rotor, the cylindrical rib is provided with through-holes extending from an inner space of the cylindrical rib through gaps between the plurality of salient poles, and a discharge resistor is installed to an outer circumference of the rotation shaft facing the inner circumferential surface of the cylindrical rib.

2. The rotating machine according to claim 1, wherein the disk-shaped spoke is provided with an air vent penetrating front and back sides of the disk-shaped spoke.

3. The rotating machine according to claim 1, wherein a fin is integrally provided to an outer circumference of the discharge resistor along an axial direction of the rotation shaft to rotate in synchronization with the rotation shaft to generate a ventilation air in a radial direction.

* * * * *